US012577375B2

(12) United States Patent
Ryoo

(10) Patent No.: US 12,577,375 B2
(45) Date of Patent: Mar. 17, 2026

(54) WATER-SOLUBLE COMPOSITION COMPRISING LYSOPHOSPHATIDYLETHANOLAMINE AND HAVING IMPROVED STABILITY, AND METHOD FOR PREPARING THE SAME

(71) Applicant: LG CHEM, LTD., Seoul (KR)

(72) Inventor: Ki Hyun Ryoo, Daejeon (KR)

(73) Assignee: LG CHEM, LTD., Seoul (KR)

( * ) Notice: Subject to any disclaimer, the term of this patent is extended or adjusted under 35 U.S.C. 154(b) by 456 days.

(21) Appl. No.: 18/028,204

(22) PCT Filed: Sep. 24, 2021

(86) PCT No.: PCT/KR2021/013010
§ 371 (c)(1),
(2) Date: Mar. 23, 2023

(87) PCT Pub. No.: WO2022/065901
PCT Pub. Date: Mar. 31, 2022

(65) Prior Publication Data
US 2023/0374269 A1 Nov. 23, 2023

(30) Foreign Application Priority Data
Sep. 24, 2020 (KR) ........................ 10-2020-0123516

(51) Int. Cl.
*C08K 5/521* (2006.01)
*A01N 1/10* (2025.01)
(Continued)

(52) U.S. Cl.
CPC ................ *C08K 5/521* (2013.01); *A01N 1/10* (2025.01); *A01N 25/22* (2013.01); *C08J 3/07* (2013.01);
(Continued)

(58) Field of Classification Search
CPC .......... C08K 5/521; C08K 5/541; A01N 1/10; A01N 25/22
See application file for complete search history.

(56) References Cited

U.S. PATENT DOCUMENTS 5,110,341 A 5/1992 Palta et al.
5,126,155 A 6/1992 Palta et al.
(Continued)

FOREIGN PATENT DOCUMENTS

AU 7942001 A 5/2002
CN 101248082 A 8/2008
(Continued)

OTHER PUBLICATIONS

Ki-Young Choi et al., Determination of Optimal Concentration of LPE (Lysophosphatidylethanol-amine) for Postharvest Stability and Quality of Strawberry Fruit, Protected Horticulture and Plant Factory, 2016, vol. 25, No. 3, pp. 153-161.
(Continued)

*Primary Examiner* — Yate' K Cutliff
(74) *Attorney, Agent, or Firm* — ROTHWELL, FIGG, ERNST & MANBECK, P.C.

(57) ABSTRACT

The present invention provides a water-soluble composition including lysophosphatidylethanolamine, an organic solvent, a silane-based auxiliary agent, a surfactant, an antifreeze, and water. According to the water-soluble composition of the present invention, a lysophosphatidylethanolamine effective ingredient is not decomposed well even at a high temperature, and since the composition is stably dissolved in water when diluted in water before applied to crops, the stability of a water-soluble formulation is excellent. In addition, since surface tension is
(Continued)

(a)

(b)

excellent, the composition may be uniformly distributed when treating fruits to show uniform ripening promoting effects of the fruits.

14 Claims, 2 Drawing Sheets

(51) Int. Cl.
*A01N 25/22* (2006.01)
*C08J 3/07* (2006.01)
*C08K 5/541* (2006.01)

(52) U.S. Cl.
CPC .......... *C08K 5/541* (2013.01); *C08J 2353/00* (2013.01); *C08J 2471/02* (2013.01); *C08K 2201/014* (2013.01)

(56) References Cited

U.S. PATENT DOCUMENTS

| | | | | |
|---|---|---|---|---|
| 2003/0064893 | A1 | 4/2003 | Palta et al. | |
| 2008/0188683 | A1* | 8/2008 | Chung | C07F 9/103 564/15 |
| 2008/0274888 | A1* | 11/2008 | Goldstein | A01N 37/46 562/556 |
| 2010/0255990 | A1* | 10/2010 | Chung | A01N 57/12 504/125 |
| 2015/0230473 | A1 | 8/2015 | Choe et al. | |
| 2019/0261631 | A1* | 8/2019 | Bhoge | A01N 25/30 |

FOREIGN PATENT DOCUMENTS

| | | | |
|---|---|---|---|
| KR | 10-2002-0033542 | A | 5/2002 |
| KR | 10-2002-0086604 | A | 11/2002 |
| KR | 10-2003-0084200 | A | 11/2003 |
| KR | 10-2006-0105918 | A | 10/2006 |
| KR | 10-2007-0003633 | A | 1/2007 |
| KR | 2008-0007474 | A | 1/2008 |
| KR | 10-2014-0081641 | A | 7/2014 |
| KR | 10-2014-0081706 | A | 7/2014 |
| KR | 2019-0072551 | A | 6/2019 |
| WO | 03091263 | A1 | 11/2003 |

OTHER PUBLICATIONS

Nikolaos Sotirhos et al., Quantitative analysis of phospholipids by 31P-NMR, Journal of Lipid Research, 1986, vol. 27, pp. 386-392.

International Search Report issued for International Application No. PCT/KR2021/013010 on Jan. 11, 2022, 4 pages.

* cited by examiner

[FIG. 1]
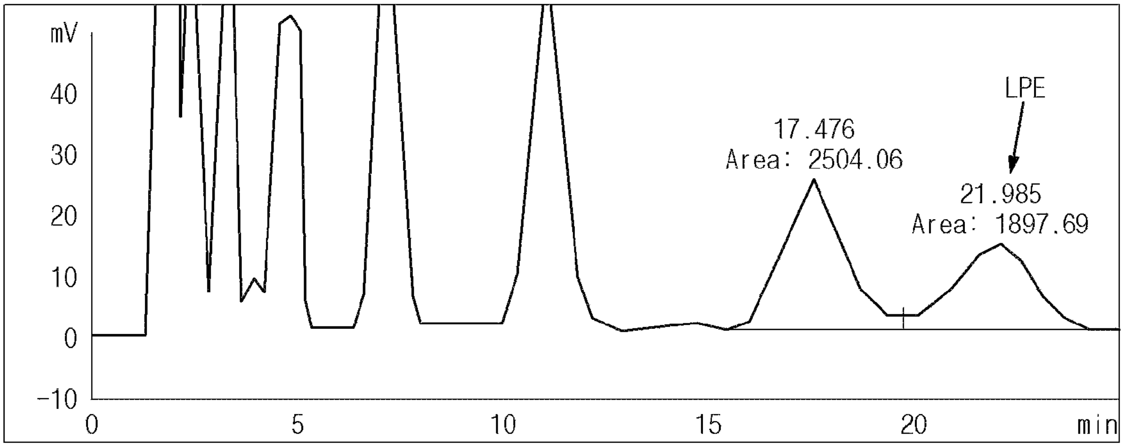
(a)
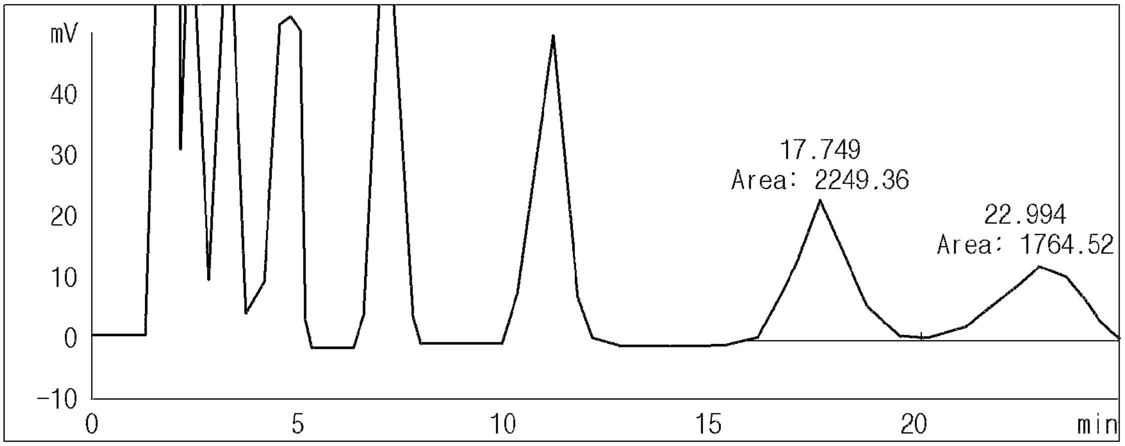
(b)

[FIG. 2]
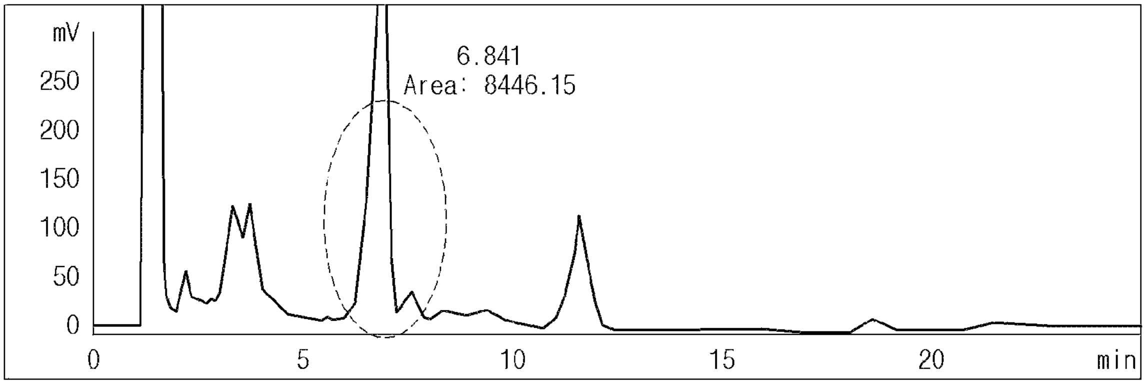
(a)
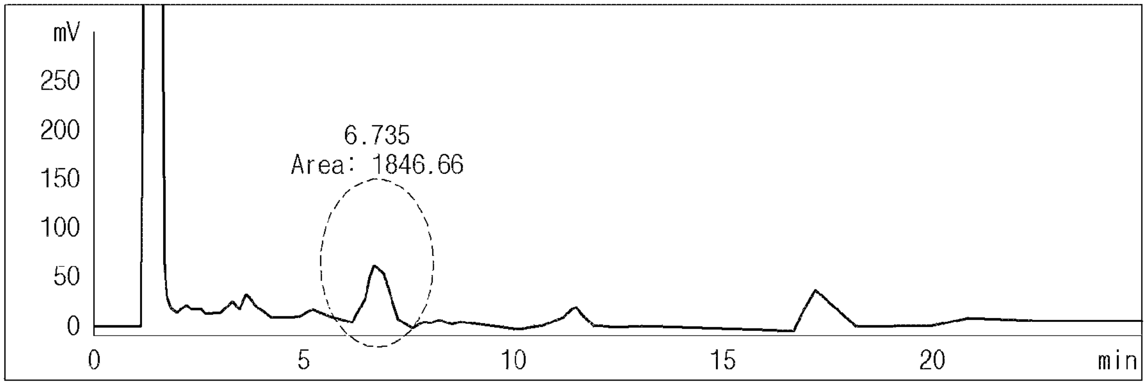
(b)

WATER-SOLUBLE COMPOSITION COMPRISING LYSOPHOSPHATIDYLETHANOLAMINE AND HAVING IMPROVED STABILITY, AND METHOD FOR PREPARING THE SAME

CROSS-REFERENCE TO RELATED APPLICATIONS

This application is a 35 U.S.C. 371 National Phase Entry Application from PCT/KR2021/013010 filed on Sep. 24, 2021, which claims the benefit of Korean Patent Application No. 10-2020-0123516, filed on Sep. 24, 2020, in the Korean Intellectual Property Office, the disclosures of which are incorporated herein in their entirety by reference.

TECHNICAL FIELD

The present invention relates to a water-soluble composition comprising lysophosphatidylethanolamine and having improved stability, and a method for preparing the same.

BACKGROUND ART

Lysophosphatidylethanolamine is a component constituting a cell membrane and is a natural compound derived from phosphatidylethanolamine which is a typical component of a cell membrane. Lysophosphatidylethanolamine is produced by partial hydrolysis for removing one of the aliphatic acid groups of phosphatidylethanolamine by the enzymatic reaction of phospholipase A2. Lysophosphatidylethanolamine is also found in human serum, and the concentration in the serum is known be about several hundreds ng/ml. Lysophosphatidylethanolamine may be obtained from egg yolk lecithin, soybean lecithin and other lecithin (Nonpatent Document).

Lysophosphatidylethanolamine is known to play a very important role in the ripening and senescence of fruits. The treatment with the lysophosphatidylethanolamine is known to suppress the senescence of the leaves and fruits of tomatoes, and the treatment after harvesting tomatoes is known to play the role of extending the storge period of fruits. (Patent Documents 1 and 2).

As described above, the lysophosphatidylethanolamine is a material which is very usefully used in an agricultural field, but there is a disadvantage in that it is difficult to store while maintaining a stable formulation in an aqueous phase. In the case of a currently commercially available aqueous solution of 10% lysophosphatidylethanolamine, a precipitate is generated at a low temperature of 20° C. or less, or a rapid decomposing phenomenon of a lysophosphatidylethanolamine effective ingredient arises, and there are problems in storage stability. In addition, when diluted in water before applied to crops, there are problems of not being dissolved stably and showing inferior water-solubilization stability.

BRIEF SUMMARY OF THE INVENTION

Technical Problem

The inventors of the present invention have been tried to develop a composition having a novel water-soluble formulation, which has excellent storage stability and excellent water-solubilization stability when diluted in water before applied to crops. As a result, the inventors found that, by preparing a composition with a water-soluble formulation using two types of organic solvents, a silane-based auxiliary agent, a surfactant and an antifreeze, the dispersibility of lysophosphatidylethanolamine in a water-soluble composition was improved, and the storage stability of a water-soluble composition and water-solubilization stability were excellent, and completed the present invention.

Accordingly, an object of the present invention is to provide a water-soluble composition including lysophosphatidylethanolamine, of which water-soluble formulation has excellent storage stability, and which may be stored, distributed or used, without degrading its quality at a low temperature or high temperature for a long time.

In addition, the present invention provides a method for preparing the water-soluble composition including lysophosphatidylethanolamine.

Technical Solution

According to an aspect of the present invention, there is provided a water-soluble composition comprising lysophosphatidylethanolamine, a first organic solvent, a second organic solvent, a silane-based auxiliary agent, a surfactant, an antifreeze, and water, wherein the first solvent and the second solvent have a weight ratio of 1.5:1 to 1:1.5, and the first organic solvent and the second organic solvent are each independently one or more selected from the group consisting of methanol, ethanol, propanol, isopropanol, n-butanol, sec-butanol, iso-butanol, tert-butanol, 1-pentanol, 1-hexanol, 1-heptanol, 1-nonanol, dodecanol, oleyl alcohol, cyclohexanone, N-methyl-2-pyrrolidone (NMP), N-ethyl-2-pyrrolidone (NEP), N,N-dimethylacetamide (DMAc), dimethylformamide (DMF), dimethylsulfoxide (DMSO), acetonitrile (MeCN), dichloromethane, tetrahydrofuran, ethyl acetate, diethyl ether, diisopropyl ether, hexane, a morpholine 4-$C_{6-12}$ acyl derivative, acetone, amyl acetate, N,N-dimethyldodecaneamide, n-butyl-3-hydroxybutyrate, dimethyl adipate, N,N-dimethyl 9-decaneamide, N,N-dimethyldodecaneamide, C9-rich aromatic hydrocarbon, C10-11-rich aromatic hydrocarbon, C11-12-rich aromatic hydrocarbon, lactic acid, 1-butyl-2-pyrrolidinone and propylene glycol monomethyl ether, where the first organic solvent and the second organic solvent are different from each other.

Another embodiment of the present invention provides a method for preparing a water-soluble composition, comprising: mixing a first solvent, a second solvent, a silane-based auxiliary agent, a surfactant, and an antifreeze and stirring to prepare a mixture solution; adding lysophosphatidylethanolamine to the mixture solution thus prepared and stirring to prepare a dispersion solution; and adding water to the dispersion solution thus prepared and stirring, wherein the first organic solvent and the second organic solvent have a weight ratio of 1.5:1 to 1:1.5, and the first organic solvent and the second organic solvent are each independently one or more selected from the group consisting of methanol, ethanol, propanol, isopropanol, n-butanol, sec-butanol, iso-butanol, tert-butanol, 1-pentanol, 1-hexanol, 1-heptanol, 1-nonanol, dodecanol, oleyl alcohol, cyclohexanone, N-methyl-2-pyrrolidone (NMP), N-ethyl-2-pyrrolidone (NEP), N,N-dimethylacetamide (DMAc), dimethylformamide (DMF), dimethylsulfoxide (DMS 0), acetonitrile (MeCN), dichloromethane, tetrahydrofuran, ethyl acetate, diethyl ether, diisopropyl ether, hexane, a morpholine 4-$C_{6-12}$ acyl derivative, acetone, amyl acetate, N,N-dimethyldodecaneamide, n-butyl-3-hydroxybutyrate, dimethyl adipate, N,N-dimethyl 9-decaneamide, N,N-dimethyldodecaneamide, C9-rich aromatic hydrocarbon, C10-11-rich aromatic hydrocarbon, C11-12-rich aromatic hydrocarbon, lactic acid, 1-butyl-2-pyrrolidinone and propylene glycol monomethyl ether, where the first organic solvent and the second organic solvent are different from each other.

Advantageous Effects

According to the water-soluble composition of the present invention, the dispersibility of lysophosphatidylethanolamine in the composition with a water-soluble formulation may be improved, storage stability at a low temperature to a high temperature may be excellent, and water-solubilization stability when diluted in water before applied to crops may also be excellent.

In addition, the water-soluble composition of the present invention has excellent surface tension, and may be uniformly distributed when treating plants or fruits to uniformly show the ripening promoting and senescence suppressing effects of plants or fruits.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

FIG. 1 shows the measured results of the amount of lysophosphatidylethanolamine using an evaporative light scattering detector (ELSD) the water-soluble composition of Example 1, (a) shows the measured result after storing for 6 weeks at room temperature and (b) shows the measured result after storing for 6 weeks at 54° C.

FIG. 2 shows the measured results of the amount of lysophosphatidylethanolamine using an evaporative light scattering detector (ELSD) the water-soluble composition of Comparative Example 1, (a) shows the measured result after storing for 4 weeks at room temperature and (b) shows the measured result after storing for 4 weeks at 54° C.

DETAILED DESCRIPTION OF THE INVENTION

Hereinafter, the present invention will be described in more detail to allow for a clearer understanding of the present invention. In this case, it will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

An embodiment of the present invention provides a water-soluble composition which has improved dispersibility of lysophosphatidylethanolamine in a composition with a water-soluble formulation, excellent storage stability at a low temperature to a high temperature, and excellent water-solubilization stability when diluted in water before applied to crops.

The water-soluble composition according to an embodiment of the present invention includes lysophosphatidylethanolamine, a first organic solvent, a second organic solvent, a silane-based auxiliary agent, a surfactant, an antifreeze, and water, wherein the first solvent and the second solvent have a weight ratio of 1.5:1 to 1:1.5, and the first organic solvent and the second organic solvent are each independently one or more selected from the group consisting of methanol, ethanol, propanol, isopropanol, n-butanol, sec-butanol, iso-butanol, tert-butanol, 1-pentanol, 1-hexanol, 1-heptanol, 1-nonanol, dodecanol, oleyl alcohol, cyclohexanone, N-methyl-2-pyrrolidone (NMP), N-ethyl-2-pyrrolidone (NEP), N,N-dimethylacetamide (DMAc), dimethylformamide (DMF), dimethylsulfoxide (DMSO), acetonitrile (MeCN), dichloromethane, tetrahydrofuran, ethyl acetate, diethyl ether, diisopropyl ether, hexane, a morpholine 4-$C_{6-12}$ acyl derivative, acetone, amyl acetate, N,N-dimethyldodecaneamide, n-butyl-3-hydroxybutyrate, dimethyl adipate, N,N-dimethyl 9-decaneamide, N,N-dimethyldodecaneamide, C9-rich aromatic hydrocarbon, C10-11-rich aromatic hydrocarbon, C11-12-rich aromatic hydrocarbon, lactic acid, 1-butyl-2-pyrrolidinone and propylene glycol monomethyl ether, where the first organic solvent and the second organic solvent are different from each other.

In the present invention, the lysophosphatidylethanolamine is a material present naturally in the plants and animals, and may use a material separated and purified from the nature. For example, the material may be separated from lecithin derived from soybeans, egg yolks, seeds, or marine sources.

The water-soluble composition according to an embodiment of the present invention may include two types of organic solvents of the first solvent and the second solvent in a weight ratio of 1.5:1 to 1:1.5, particularly, in a weight ratio of 1:1. If the above numerical range is satisfied, excellent storage stability may be maintained. If the weight ratio is less than the lower limit in the numerical range, problems of generating a precipitate may arise during storing at a low temperature, and if the weight ratio is greater than the upper limit in the numerical range, layer separation may arise during storing at a low temperature.

Preferably, the first organic solvent and the second organic solvent are different from each other and include each independently one or more selected from the group consisting of ethanol, propanol, isopropanol, n-butanol, sec-butanol, iso-butanol, tert-butanol, 1-hexanol, N-methyl-2-pyrrolidone (NMP), N-ethyl-2-pyrrolidone (NEP), N,N-dimethylacetamide (DMAc), dimethylformamide (DMF), ethyl acetate, diethyl ether, diisopropyl ether, a morpholine 4-$C_{6-12}$ acyl derivative, acetone, amyl acetate, N,N-dimethyldodecaneamide, n-butyl-3-hydroxybutyrate, dimethyl adipate, N,N-dimethyl 9-decaneamide, N,N-dimethyldodecaneamide, and 1-butyl-2-pyrrolidinone.

More preferably, the first organic solvent may be isopropanol, and the second organic solvent may be 1-hexanol.

In addition, the water-soluble composition may further include a third organic solvent in addition to the first organic solvent and the second organic solvent, and in this case, the third organic solvent is a different material from the first organic solvent and the second organic solvent, and may be one or more selected from the group consisting of methanol, ethanol, propanol, isopropanol, n-butanol, sec-butanol, iso-butanol, tert-butanol, 1-pentanol, 1-hexanol, 1-heptanol, 1-nonanol, dodecanol, oleyl alcohol, cyclohexanone, N-methyl-2-pyrrolidone (NMP), N-ethyl-2-pyrrolidone (NEP), N,N-dimethylacetamide (DMAc), dimethylformamide (DMF), dimethylsulfoxide (DMSO), acetonitrile (MeCN), dichloromethane, tetrahydrofuran, ethyl acetate, diethyl ether, diisopropyl ether, hexane, a morpholine 4-$C_{6-12}$ acyl derivative, acetone, amyl acetate, N,N-dimethyldodecaneamide, n-butyl-3-hydroxybutyrate, dimethyl adipate, N,N-dimethyl 9-decaneamide, N,N-dimethyldodecaneamide, C9-rich aromatic hydrocarbon, C10-11-rich aromatic hydrocarbon, C11-12-rich aromatic hydrocarbon, lactic acid, 1-butyl-2-pyrrolidinone and propylene glycol monomethyl ether, preferably, one or more selected from the group consisting of ethanol, propanol, isopropanol, n-butanol, sec-butanol, iso-butanol, tert-butanol, 1-hexanol, N-methyl-2-pyrrolidone (NMP), N-ethyl-2-pyrrolidone (NEP), N,N-dimethylacetamide (DMAc), dimethylformamide (DMF), ethyl acetate, diethyl ether, diisopropyl ether, a morpholine 4-$C_{6-12}$ acyl derivative, acetone, amyl acetate, N,N-dimethyldodecaneamide, n-butyl-3-hydroxybutyrate, dimethyl adipate, N,N-dimethyl 9-decaneamide, N,N-dimethyldodecaneamide, and 1-butyl-2-pyrrolidinone, more preferably, N-methyl-2-pyrrolidone (NMP).

In addition, if the water-soluble composition includes the third organic solvent, the first organic solvent and the third organic solvent may have a weight ratio of about 1:1 to 1:2, preferably, 2:3, and the second organic solvent and the third organic solvent may have a weight ratio of about 1:1 to 1:2, preferably, 2:3.

More particularly, the water-soluble composition may include the first organic solvent, the second organic solvent and the third organic solvent, and here, the first organic solvent may be isopropanol, the second organic solvent may be 1-hexanol, and the third organic solvent may be N-methyl-2-pyrrolidone (NMP).

The silane-based auxiliary agent may play the role of increasing the dispersibility of the lysophosphatidylethanolamine and assisting the attachment of the lysophosphatidylethanolamine to plants or fruits well. Particularly, the silane-based auxiliary agent may include a compound represented by Formula 1 below.

[Formula 1]

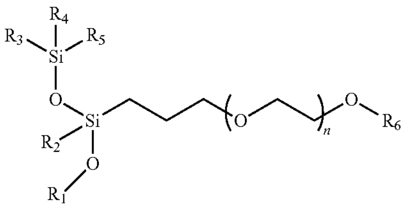

In the above formula, $R_1$ is selected from the group consisting of hydrogen atom and a substituted with a C1-C4 hydrocarbon group or unsubstituted silyl group, preferably, hydrogen atom or a trimethylsilyl group, $R_2$ to $R_6$ are each independently selected from the group consisting of hydrogen atom and a C1-C4 hydrocarbon group, preferably, an alkyl group, more preferably, a methyl group, and n is an integer of 1 to 10, preferably, an integer of 1 to 5, more preferably, an integer of 1 to 3.

Preferably, $R_1$ may be hydrogen atom or a trimethylsilyl group, $R_2$ to $R_6$ may be hydrogen atom or methyl groups, and n may be an integer of 1 to 3.

Particular examples of the compound represented by Formula 1 may include one or more selected from the group consisting of Silwet® L-77, Silwet® HS 429, Silwet® HS 312, Silwet® HS 508, Silwet® HS 604, BREAK-THRU® S 200, BREAK-THRU® S 233, and BREAK-THRU® S 278.

The surfactant may use an anionic surfactant, or a nonionic surfactant. For example, the surfactant may include one or more selected from the group consisting of a sulfate salt, a sulfonate salt, a phosphate salt, an alcohol ether, an alkylphenol ether, a block co-polymer, a fatty acid alkoxylate, a fatty amine alkoxylate, an alkoxylated vegetable oil, a sorbitol alkoxylate, and an ester.

For example, the surfactant may include one or more selected from the group consisting of a polyoxyethylene alkyl ether [$RO(CH_2CH_2O)_mH$], a fatty acid sorbitan ester, a fatty acid diethanolamine [$RCON(CH_2CH_2OH)_2$], an alkyl mono glyceryl ether [$ROCH_2CH(OH)CH_2OH$], and a polyethylene glycol-polypropylene glycol-polyethylene glycol block copolymer.

For example, the polyoxyethylene alkyl ether may include one or more selected from the group consisting of polyoxyethylene lauryl ether, polyoxyethylene tridecyl ether, polyoxyethylene cetyl ether, polyoxyethylene oleyl ether, polyoxy dodecyl ether, polyoxy tetradecyl ether, and polyoxy hexadecyl ether.

The antifreeze may show effects of increasing the dispersibility of the lysophosphatidylethanolamine and stabilizing the lysophosphatidylethanolamine particularly at a low temperature.

The antifreeze may include one or more selected from the group consisting of propylene glycol, ethylene glycol, diethylene glycol, dipropylene glycol, tripropylene glycol, glycerin and isopropanol.

In addition, the water-soluble composition of the present invention may additionally include an antioxidant. Particularly, the antioxidant may include one or more selected from the group consisting of gallic acid, methyl gallate, ethyl gallate, propyl gallate, octyl gallate, dodecyl gallate, amyl gallate, isoamyl gallate, acylated gallate, epigallocatechin gallate (EGCG), erythorbic acid and ascorbic acid.

In addition, the water-soluble composition may include, based on 100 parts by weight of the water-soluble composition, 0.01 to 5 parts by weight of the lysophosphatidylethanolamine; to 50 parts by weight of an organic solvent; 1 to 10 parts by weight of the silane-based auxiliary agent; 5 to 30 parts by weight of the surfactant; 3 to 15 parts by weight of an antifreeze; and 20 to parts by weight of the water, and the organic solvent is the sum of the first organic solvent and the second organic solvent. In addition, if the water-soluble composition includes a third organic solvent, the amount of the organic solvent may be the sum of the first organic solvent, the second organic solvent and the third organic solvent.

In addition, the water-soluble composition may further include an antioxidant in 0.01 to 3 parts by weight based on 100 parts by weight of the water-soluble composition.

If the numerical range is satisfied, the stability of the water-soluble composition may be improved, and excellent storage stability and water-solubilization stability may be shown.

In addition, if the water-soluble composition of the present invention is applied to plants or fruits, the ripening of the plants or fruits may be promoted, and the senescence thereof may be suppressed. Particularly, the water-soluble composition of the present invention may show effects of assisting the rapid ripening of fruits, promoting coloring, extending a storage period, or the like.

The plant may be selected from the group consisting of corn, rice, barley, sorghum and wheat, without specific limitation.

The fruit may be selected from the group consisting of apples, pears, tomatoes, peaches, plums, cherries, grapes, cranberries, blueberries and strawberries, without specific limitation.

Another embodiment of the present invention provides a method for preparing a water-soluble composition, including: mixing a first solvent, a second solvent, a silane-based auxiliary agent, a surfactant, and an antifreeze, and stirring; adding lysophosphatidylethanolamine to the mixture solution thus prepared, and stirring to disperse; and adding water to the dispersion solution thus prepared, and stirring, wherein the first organic solvent and the second organic solvent have a weight ratio of 1.5:1 to 1:1.5, the first organic solvent and the second organic solvent are each independently one or more selected from the group consisting of a monovalent or polyhydric alcohol of 1 to 20 carbon atoms, methanol, ethanol, propanol, isopropanol, n-butanol, sec-butanol, iso-butanol, tert-butanol, 1-pentanol, 1-hexanol, 1-heptanol, 1-nonanol, dodecanol, oleyl alcohol, cyclohexanone, N-methyl-2-pyrrolidone (NMP), N-ethyl-2-pyrrolidone (NEP), N,N-dimethylacetamide (DMAc), dimethylformamide (DMF), dimethylsulfoxide (DMS 0), acetonitrile (MeCN), dichloromethane, tetrahydrofuran, ethyl acetate, diethyl ether, diisopropyl ether, hexane, a morpholine 4-$C_{6-12}$ acyl derivative, acetone, amyl acetate, N,N-dimethyldodecaneamide, n-butyl-3-hydroxybutyrate, dimethyl adipate, N,N-dimethyl 9-decaneamide, N,N-dimethyldodecaneamide, C9-rich aromatic hydrocarbon, C10-11-rich aromatic hydrocarbon, C11-12-rich aromatic hydrocarbon, lactic acid, 1-butyl-2-pyrrolidinone and propylene glycol monomethyl ether, where the first organic solvent and the second organic solvent are different from each other.

The method for preparing a water-soluble composition of the present invention may include: mixing, based on 100 parts by weight of the water-soluble composition, 20 to 50 parts by weight of the organic solvent; 5 to 30 parts by weight of the surfactant; 1 to 10 parts by weight of the silane-based auxiliary agent; and 3 to 15 parts by weight of the antifreeze, and stirring; adding 0.01 to 5 parts by weight of the lysophosphatidylethanolamine based on 100 parts by weight of the water-soluble composition to the mixture solution thus prepared, and stirring to disperse; and adding 20 to 40 parts by weight of water based on 100 parts by weight of the water-soluble composition to the dispersion solution thus prepared, and stirring. Here, the organic solvent may be the sum of the first organic solvent and the second organic solvent.

In addition, the preparation method may further use a third organic solvent together with the first organic solvent and the second organic solvent, and if the water-soluble composition includes the third organic solvent, the amount of the organic solvent may be the sum of the first organic solvent, the second organic solvent and the third organic solvent.

In addition, the method for preparing the water-soluble composition of the present invention may further include a step of dissolving an antioxidant in the water. The antioxidant may be used in 0.01 to 3 parts by weight based on 100 parts by weight of the water-soluble composition.

Particular contents on the lysophosphatidylethanolamine, the first organic solvent, the second organic solvent, the silane-based auxiliary agent, the surfactant, and the antifreeze are the same as described above, and particular explanation thereon will be omitted.

Embodiments below are suggested to provide complete disclosure and explanation on the composition and the method, provided in the present application and the evaluation methods thereof to a person skilled in the art, however are intended for only illustration. Accordingly, the embodiments are not intended to limit the scope which is regarded as the invention by the inventors. Reaction conditions, for example, the concentrations of constituent elements, a desired solvent, a solvent mixture, a temperature, a pressure, other reaction parameters, purity, yield, or the like, which may be used for optimizing the properties of a product may have various modifications and combinations. Such conditions are regarded in the range of the present application. Any combinations of the above-explained elements among possible changes are included in the present invention unless differently indicated in the present invention or otherwise clearly denied contextually.

Example 1

(1) Preparation of Dispersion Solvent 15 g of a PEG-PPG-PEG block copolymer (CAS No. 9003-11-6), 5 g of polyoxyethylene lauryl ether (CAS No. 9002-92-0), 7.5 g of Silwet® HS 604, 8 g of propylene glycol, 10 g of 1-hexanol, 10 g of isopropanol, and 15 g of NMP were injected in order to a 250 ml, beaker and stirred at 300 rpm for 10 minutes until a homogenized state was obtained to prepare a dispersion solvent.

(2) Preparation of Water-Soluble Composition

To the dispersion solvent thus prepared, 1.1 g of lysophosphatidylethanolamine (Dusan Solus, NATURELOX) was added and stirred at 300 rpm for 20 minutes to prepare a dispersion.

To the dispersion thus prepared, a solution obtained by injecting 0.15 g of propyl gallate (Daejung Chemicals) into 28.25 g of water and dissolving for 10 minutes, was slowly injected while stirring at 400 rpm for 30 minutes.

Then, ultrasonic dispersion was performed at room temperature for 10 minutes using BRANSON 8800 to prepare a water-soluble composition.

Example 2

A dispersion solvent was prepared by the same manner in Example 1 except for injecting 7.5 g of the isopropanol instead of 10 g, in Example 1, and by using the dispersion solvent, a water-soluble composition including lysophosphatidylethanolamine was prepared.

Example 3

A dispersion solvent was prepared by the same manner in Example 1 except for injecting 7.5 g of the 1-hexanol instead of 10 g, in Example 1, and by using the dispersion solvent, a water-soluble composition including lysophosphatidylethanolamine was prepared.

Example 4

A dispersion solvent was prepared by the same manner in Example 1 except for injecting 5.0 g of the lysophosphatidylethanolamine (Dusan Solus, NATURELOX) instead of 1.1 g, in Example 1, and by using the dispersion solvent, a water-soluble composition including lysophosphatidylethanolamine was prepared.

Comparative Example 1

NATURELOX purchased from Dusan Solus was used as a water-soluble composition of Comparative Example 1.

Comparative Example 2

A dispersion solvent was prepared by the same manner in Example 1 except for injecting 5 g of the isopropanol instead of 10 g, in Example 1, and by using the dispersion solvent, a water-soluble composition including lysophosphatidylethanolamine was prepared.

Comparative Example 3

A dispersion solvent was prepared by the same manner in Example 1 except for injecting 5 g of the 1-hexanol instead of 10 g, in Example 1, and by using the dispersion solvent, a water-soluble composition including lysophosphatidylethanolamine was prepared.

Comparative Example 4

A dispersion solvent was prepared by the same manner in Example 1 except for injecting 2.5 g of the isopropanol instead of 10 g, in Example 1, and by using the dispersion solvent, a water-soluble composition including lysophosphatidylethanolamine was prepared.

Comparative Example 5

A dispersion solvent was prepared by the same manner in Example 1 except for injecting 2.5 g of the 1-hexanol instead of 10 g, in Example 1, and by using the dispersion solvent, a water-soluble composition including lysophosphatidylethanolamine was prepared.

Experimental Example

1. Evaluation of Storage Stability at High Temperature

In order to evaluate the stability of lysophosphatidylethanolamine in a composition with a water-soluble formulation at a high temperature, the water-soluble compositions of Example 1 and Comparative Example 1 were stored at room temperature and 54° C. for 6 weeks (for Example 1) or for 4 weeks (for Comparative Example 1), and the area values of a lysophosphatidylethanolamine effective ingredient were measured using an evaporative light scattering detector (ELSD).

Particular analysis conditions are as follows, and the analysis results on the water-soluble compositions of Example 1 and Comparative Example 1 are shown in FIG. 1 and FIG. 2, respectively.

1) Detector: ELS detector 500 (Agilent technology)
2) Column: Nava Pak silica column, 3.9×150 mm (Waters)
3) Temperature: detector–90° C.
4) Flow rate: 1.0 ml/min
5) Specimen injection volume: 10 μl
6) A solvent: hexane:isopropanol=3:4 (v/v)
7) B solvent: hexane:isopropanol:water=3:4:0.6 (v/v)

As shown in FIG. 1, in the case of the water-soluble composition of Example 1, the LPE area values measured after storing at room temperature and 54° C. for 6 weeks were 1897 and 1764, respectively, and reduced by about 7%, and it could be confirmed that between the LPE area values stored at room temperature and a high temperature were not changed largely. These results verify that LPE decomposition was not generated even stored at a high temperature.

On the contrary, as shown in FIG. 2, in the case of the water-soluble composition of Comparative Example 1, the LPE area values measured after storing at room temperature and 54° C. for 4 weeks were 8446 and 1846, respectively, and it could be confirmed that the LPE area value was reduced by about 78% in the case of storing at a high temperature (54° C.). Accordingly, in the case of the composition of Comparative Example 1, a large amount of LPE was decomposed during storing at a high temperature, and it could be confirmed that the stability of an effective ingredient at a high temperature is very poor.

2. Evaluation of Water-Solubilization Stability

In order to evaluate water-solubilization stability in the case of diluting the water-soluble composition, the water-soluble compositions of Example 1 and Comparative Example 1 were diluted by 1000 times each (mixing 1 g of a water-soluble composition and 1000 ml of water), and the change of an appearance phase was observed with the naked eye.

It could be confirmed that the clear solution of the composition of Comparative Example 1 changed cloudy after 10 minutes, and after 2 days, the solution changed to opaque. Accordingly, it could be confirmed that the composition of Comparative Example 1 showed poor water-solubilization stability of the water-soluble composition.

On the contrary, the water-soluble composition of Example 1 of the present invention maintained transparency even after 2 days, and the water-solubilization stability of the water-soluble composition was excellent.

3. Evaluation of Surface Tension

The water-soluble compositions of Example 1 and Comparative Example 1 were diluted by 1000 times each, and surface tension was measured using a bubble pressure tensiometer (KRUSS Co., BP2), and the results are shown in Table 1 below.

TABLE 1

| No. | Surface tension when diluted by 1000 times (mN/m) |
|---|---|
| Example 1 | 42-43 |
| Comparative Example 1 | 70-71 |

In the results of Table 1, since the surface tension of the water-soluble composition of Example 1 is low, if applied to fruits, or the like, it is expected to be coated evenly. On the contrary, the water-soluble composition of Comparative Example 1 has somewhat high surface tension, and if applied to fruits, or the like, it is expected to be coated unevenly but gathered together.

Through the results, it could be anticipated that the water-soluble composition of the present invention may be distributed evenly on fruits, or the like, and excellent effects of promoting the ripening of fruits, or the like may be achieved.

4. Evaluation of Storage Stability at Low Temperature

In order to evaluate the storage stability of a water-soluble composition when storing at a low temperature, the compositions of Example 1 to Example 4, and Comparative Examples 2 to 5 were stored at 0° C. for 2 weeks, and the generation or not of a precipitate, the generation or not of layer separation phenomenon, or the like were observed with the naked eye, and the results are shown in Table 2 below.

TABLE 2

| No. | Appearance change |
|---|---|
| Example 1 | No change |
| Example 2 | No change |
| Example 3 | No change |
| Example 4 | No change |
| Comparative Example 2 | Layer separation observed |
| Comparative Example 3 | Generate a small quantity of precipitate |
| Comparative Example 4 | Layer separation observed |
| Comparative Example 5 | Generate a small quantity of precipitate |

From the results of Table 2, in the case of the water-soluble composition according to the present invention, including a first organic solvent and a second organic solvent in a weight ratio of 1:1.5 to 1.5:1, it could be confirmed that the storage stability at a low temperature was excellent.

The invention claimed is:

1. A water-soluble composition comprising lysophosphatidylethanolamine, a first organic solvent, a second organic solvent, a silane-based auxiliary agent, a surfactant, an antifreeze, and water, wherein the first organic solvent and the second organic solvent have a weight ratio of 1.5:1 to 1:1.5, the first organic solvent is isopropanol, the second organic solvent is 1-hexanol, and the silane-based auxiliary agent comprises a compound represented by the following Formula 1:

[Formula 1]

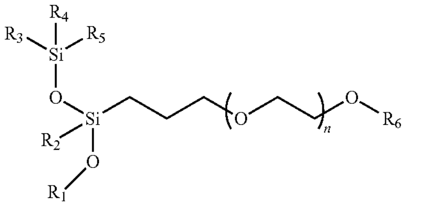

in the Formula 1, $R_1$ is selected from the group consisting of hydrogen atom and a substituted with a C1-C4 hydrocarbon group or unsubstituted silyl group, $R_2$ to $R_6$ are each independently selected from the group consisting of hydrogen atom and a C1-C4 hydrocarbon group, and n is an integer of 1 to 10.

2. The water-soluble composition according to claim 1, comprising, based on 100 parts by weight of the water-soluble composition, 0.01 to 5 parts by weight of the lysophosphatidylethanolamine; 20 to 50 parts by weight of an organic solvent; 1 to 10 parts by weight of the silane-based auxiliary agent; 5 to 30 parts by weight of the surfactant; 3 to 15 parts by weight of the antifreeze; and 20 to 40 parts by weight of the water, and the organic solvent is the sum of the first organic solvent and the second organic solvent.

3. The water-soluble composition according to claim 1, further comprising N-methyl-2-pyrrolidone (NMP).

4. The water-soluble composition according to claim 1, wherein the surfactant comprises one or more selected from the group consisting of a polyoxyethylene alkyl ether, a fatty acid sorbitan ester, a fatty acid diethanolamine, an alkyl mono glyceryl ether, and a polyethylene glycol-polypropylene glycol-polyethylene glycol block copolymer.

5. The water-soluble composition according to claim 1, wherein the antifreeze comprises one or more selected from the group consisting of propylene glycol, ethylene glycol, diethylene glycol, dipropylene glycol, tripropylene glycol, glycerin, and isopropanol.

6. The water-soluble composition according to claim 1, further comprising 0.01 to 3 parts by weight of an antioxidant based on 100 parts by weight of the water-soluble composition.

7. The water-soluble composition according to claim 6, wherein the antioxidant comprises one or more selected from the group consisting of gallic acid, methyl gallate, ethyl gallate, propyl gallate, octyl gallate, dodecyl gallate, amyl gallate, isoamyl gallate, acylated gallate, epigallocatechin gallate (EGCG), erythorbic acid and ascorbic acid.

8. A method for preparing a water-soluble composition, the method comprising:

mixing a first solvent, a second solvent, a silane-based auxiliary agent, a surfactant, and an antifreeze and stirring to prepare a mixture solution;

adding lysophosphatidylethanolamine to the mixture solution and stirring to prepare a dispersion solution; and adding water to the dispersion solution and stirring, wherein the first organic solvent and the second organic solvent have a weight ratio of 1.5:1 to 1:1.5, the first organic solvent is isopropanol, the second organic solvent is 1-hexanol, and the silane-based auxiliary agent comprises a compound represented by the following Formula 1:

[Formula 1]

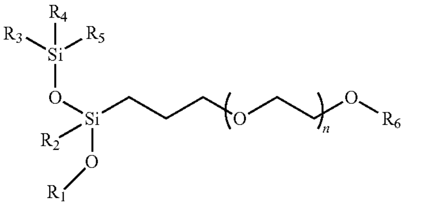

in the Formula 1, $R_1$ is selected from the group consisting of hydrogen atom and a substituted with a C1-C4 hydrocarbon group or unsubstituted silyl group, $R_2$ to $R_6$ are each independently selected from the group consisting of hydrogen atom and a C1-C4 hydrocarbon group, and n is an integer of 1 to 10.

9. The method for preparing a water-soluble composition according to claim 8, further comprising dissolving an antioxidant in the water.

10. The method for preparing a water-soluble composition according to claim 8, comprising, mixing 20 to 50 parts by weight of an organic solvent; 5 to 30 parts by weight of the surfactant; 1 to 10 parts by weight of the silane-based auxiliary agent; and 3 to 15 parts by weight of the antifreeze, based on 100 parts by weight of the water-soluble composition, and stirring;

adding 0.01 to 5 parts by weight of the lysophosphatidylethanolamine based on 100 parts by weight of the water-soluble composition to the mixture solution, and stirring to prepare a dispersion solution; and adding 20 to 40 parts by weight of the water based on 100 parts by weight of the water-soluble composition to the dispersion solution, and stirring, wherein the organic solvent is the sum of the first organic solvent and the second organic solvent.

11. The method for preparing a water-soluble composition according to claim 8, further comprising N-methyl-2-pyrrolidone (NMP).

12. The method for preparing a water-soluble composition according to claim 8, wherein the surfactant comprises one or more selected from the group consisting of a polyoxyethylene alkyl ether, a fatty acid sorbitan ester, a fatty acid diethanolamine, an alkyl mono glyceryl ether, and a polyethylene glycol-polypropylene glycol-polyethylene glycol block copolymer.

13. The method for preparing a water-soluble composition according to claim 8, wherein the antifreeze comprises one or more selected from the group consisting of propylene glycol, ethylene glycol, diethylene glycol, dipropylene glycol, tripropylene glycol, glycerin, and isopropanol.

14. The method for preparing a water-soluble composition according to claim 9, wherein the antioxidant comprises one or more selected from the group consisting of gallic acid, methyl gallate, ethyl gallate, propyl gallate, octyl gallate, dodecyl gallate, amyl gallate, isoamyl gallate, acylated gallate, epigallocatechin gallate (EGCG), erythorbic acid and ascorbic acid.

* * * * *